(12) United States Patent
Vivanco et al.

(10) Patent No.: US 9,071,652 B1
(45) Date of Patent: Jun. 30, 2015

(54) DEMAND BASED COMMUNICATION FORMAT SWITCHING

(75) Inventors: Daniel Vivanco, Reston, VA (US); Aik Chindapol, Washington, DC (US)

(73) Assignee: Sprint Spectrum L.P., Overland Park, KS (US)

( * ) Notice: Subject to any disclaimer, the term of this patent is extended or adjusted under 35 U.S.C. 154(b) by 673 days.

(21) Appl. No.: 13/206,774

(22) Filed: Aug. 10, 2011

(51) Int. Cl.
  *G06F 15/173* (2006.01)
  *H04L 29/08* (2006.01)

(52) U.S. Cl.
  CPC .................................. *H04L 67/2842* (2013.01)

(58) Field of Classification Search
  CPC .... H04L 67/2819; H04L 45/306; H04L 67/06
  USPC .................................................. 709/223, 232
  See application file for complete search history.

(56) References Cited

U.S. PATENT DOCUMENTS

| | | | |
|---|---|---|---|
| 8,265,067 B2 * | 9/2012 | Chaar et al. ................... | 709/238 |
| 2007/0255797 A1 | 11/2007 | Dunn et al. | |
| 2008/0064393 A1 | 3/2008 | Oommen et al. | |
| 2010/0099405 A1 | 4/2010 | Brisebois et al. | |
| 2010/0262682 A1 | 10/2010 | Dunn et al. | |

* cited by examiner

*Primary Examiner* — Phuoc Nguyen

(57) ABSTRACT

Application requirements of at least two applications of a wireless device in communication with a wireless communication network are determined, an access node list comprising available mobile communication formats and network load information from each access node in communication with the wireless device is received, and a mobile communication format from among the available mobile communication formats for each of the at least two applications is determined. A communication schedule based on the application requirements of the at least two applications, the determined mobile communication formats, and the network load information is generated, and data is communicated between the wireless device and the access node according to the communication schedule.

20 Claims, 5 Drawing Sheets

DEMAND BASED COMMUNICATION FORMAT SWITCHING

TECHNICAL BACKGROUND

Multi-technology communications networks are capable of providing access to a communication network using more than one communication format. Current multi-technology network implementations do not take into consideration the type of application running on a wireless device or the characteristics of the available communication formats when choosing a communication format, whether from a single access point or from more than one access point within communication range of the wireless device. While wireless devices can access the same services over different communication formats, the performance of applications on the wireless device can be enhanced or degraded based on the communication format selected.

OVERVIEW

Application requirements of at least two applications of a wireless device in communication with a wireless communication network are determined, an access node list comprising available mobile communication formats and network load information from each access node in communication with the wireless device is received, and a mobile communication format from among the available mobile communication formats for each of the at least two applications is determined. A communication schedule based on the application requirements of the at least two applications, the determined mobile communication formats, and the network load information is generated, and data is communicated between the wireless device and the access node according to the communication schedule.

DETAILED DESCRIPTION

In one embodiment, application requirements of at least two applications of a wireless device in communication with a wireless communication network are determined, and an access node list comprising available mobile communication formats and network load information from each access node in communication with the wireless device is received. A mobile communication format from among the available mobile communication formats for each of the at least two applications is determined. Based on the application requirements of the at least two applications, the determined mobile communication formats, and the network load information, a communication schedule is generated, and data is communicated between the wireless device and the access node according to the communication schedule.

Figure 1:
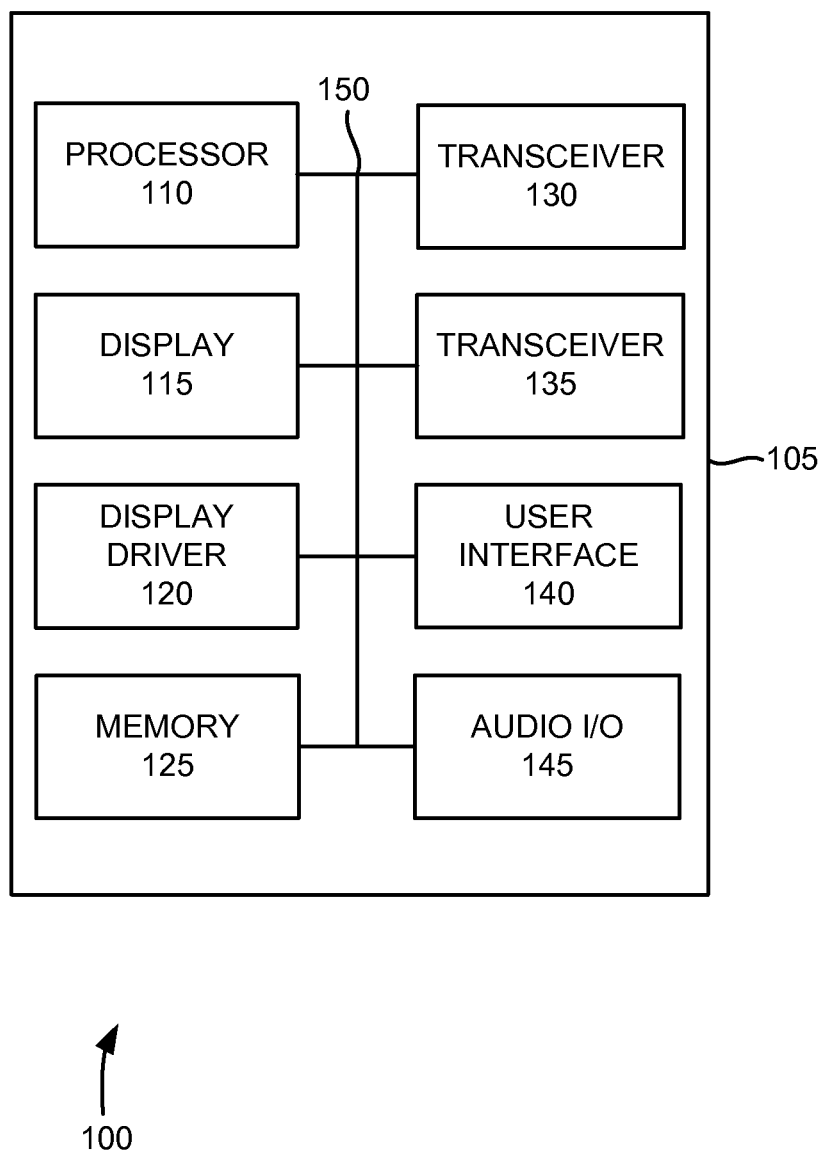
FIG. 1 illustrates an exemplary wireless device.

FIG. 1 illustrates an exemplary wireless device 100 comprising a processor 110, a display 115, a display driver 120, a memory 125, a first transceiver 130, a second transceiver 135, a user interface 140, and an audio input/output 145. Display 115 can display information, and can be coupled with user interface 140 to receive input, such as by a touch screen or similar device. Display driver 120 controls the display of information on the display 115, such as an image or a video clip. Memory 125 can store data, and for example comprises a disk drive, a flash drive, a solid state memory device, a memory circuitry, or some other memory device, in various forms of volatile and non-volatile memory storage. Memory 125 can store software comprising for example computer programs, firmware, or some other form of machine-readable instructions, and may include an operating system, utilities, drivers, network interfaces, applications, or some other type of software. Device 100 can also include an audio input and output, such as audio I/O 140, which can comprise a speaker to produce sound and/or a microphone to receive sound input.

The device 100 may include a transceivers 130 and 135 which enable the device 100 to communicate wirelessly. The presence of two transceivers enables the device 100 to communicate in two different communication formats. Though two transceivers are illustrated in device 100, this is not limiting, and more transceivers can be included in device 100. Transceivers 130 and 135 can enable transmission and reception of signals through one or more antennas (not illustrated). Wireless signals for example comprise radio frequency, microwave, infrared, laser, visible light, and other similar signals.

Processor 110 can retrieve and execute software from the memory 125, process data, and control the operation of elements 115-145. Elements 110-145 can communicate over communication link 150, for example a communication bus. Each of the elements 110-150 can be disposed within, for example, a housing 105, but this is by no means a requirement or limitation.

Figure 2:
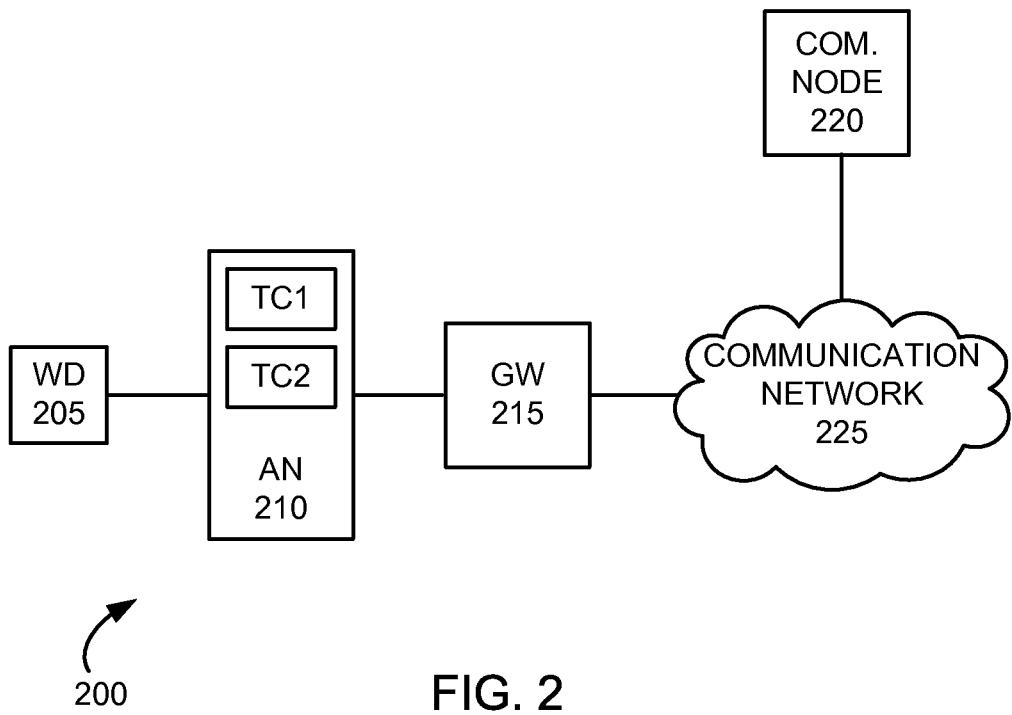
FIG. 2 illustrates an exemplary communication system.

FIG. 2 illustrates an exemplary communication system 200 comprising a wireless device 205, an access node 210, a gateway 215, a communication network 225, and a communication node 220. Other network elements may be present in the communication system 200 to facilitate wireless communication but are omitted for clarity, such as gateways, routers, mobile switching centers, and location registers such as a home location register or visitor location register. Examples of a wireless device 205 include a telephone, a computer, a personal digital assistant, an internet access device, or other device capable of wireless communication, including combinations thereof. Access node 210 communicates with the wireless device 205, and can be for example a base transceiver station or an eNodeB device. Access node 210 can include more than one transceiver to enable the access node to communicate using more than one communication format. For example, access node 210 is illustrated in FIG. 2 with two transceivers, TC1 and TC2, though this is not a requirement or limitation, and an access node can include more transceivers.

Communication network 225 is a network or internetwork and is in communication with the gateway 215 and communication node 220. Communication node 220 is a network node which permits the wireless device 205 to register with a communication system. The wireless device 205, the access node 210, the gateway 215, the communication network 225, and the communication node 220 each communicate over wired or wireless communication links or combinations thereof. Wired communication links can be, for example, twisted pair cable, coaxial cable or fiber optic cable, or combinations thereof. Wireless communication links can be a radio frequency, microwave, infrared, or other similar signal.

Wireless communications links can use a suitable communication format, for example, Global System for Mobile telecommunications (GSM), Code Division Multiple Access (CDMA), Evolution-Data Optimized (EV-DO), Worldwide Interoperability for Microwave Access (WiMAX), or Long Term Evolution (LTE), or combinations thereof. Other communication formats can also be used. Different communication formats employed by a wireless communication network may have different characteristics including variations in coverage area and penetration, available capacity, and total capacity. In addition, different communication formats may utilize different transmission schemes, including time division and frequency division duplexing (TDD and FDD, respectively). For example, a multi-band network such as LTE can provide network access to wireless devices using multiple communication formats, such as, for example, a 1.9 GHz carrier using FDD and a 2.5 GHz carrier using TDD. Other communication formats are also possible.

Figure 3:
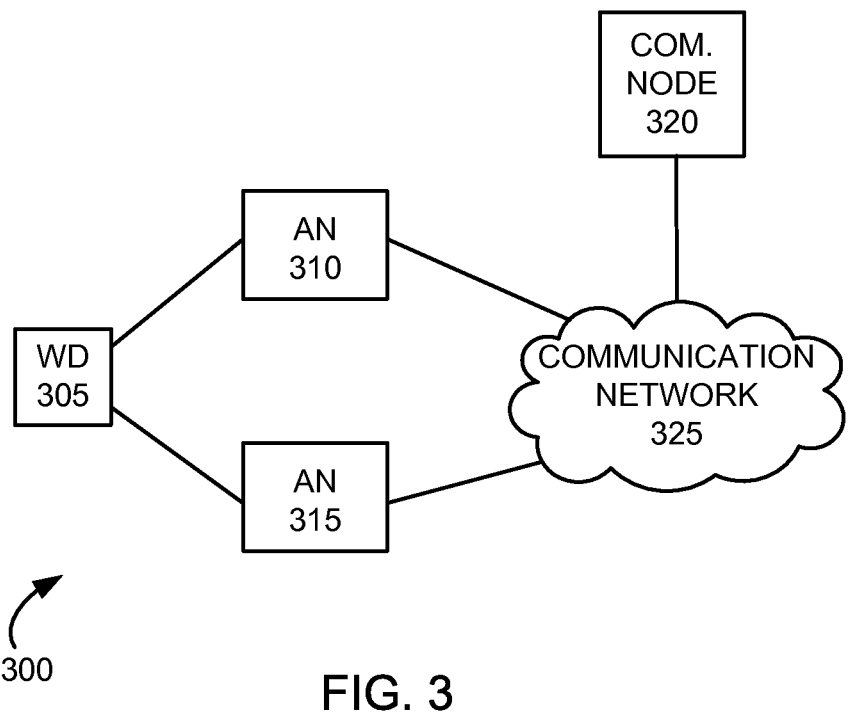
FIG. 3 illustrates another exemplary communication system.

FIG. 3 illustrates another exemplary communication system 300 comprising a wireless device 305, a first access node 310, a second access node 315, a communication network 325, and a communication node 320. Other network elements may be present in the communication system 300 to facilitate wireless communication but are omitted for clarity, such as gateways, routers, mobile switching centers, and location registers such as a home location register or visitor location register. The elements of communication system 300 are analogous to similar elements of communication system 200 in many respects. Communication system 300 illustrates two access nodes 310 and 315, each including a single transceiver (not illustrated) to communicate through a single communication format. The wireless device 305 can communicate with both access nodes 310 and 315, and thus can communicate using the communication formats employed by each access node.

Combinations of communication systems 200 and 300 are also possible. For example, a communication system can include access nodes with multiple transceivers and access nodes with one transceiver. The access nodes can have overlapping coverage areas, such that a wireless device can communicate using a plurality of communication formats with several access nodes.

Multi-technology communications networks such as communication systems 200 and 300 can provide a wireless device with access to a communication network through more than one communication format. The different communication formats employed by a wireless communication network may have different characteristics including variations in coverage area and penetration, available capacity, and total capacity. Current multi-technology network implementations do not take into consideration the type of device application or the characteristics of the available communication formats when choosing a communication format, whether from a single access point or from more than one access point within communication range of the wireless device. While wireless devices can access the same services over different communication formats, the performance of applications on the wireless device can be enhanced or degraded based on the communication format selected.

For example, a wireless device located in a coverage area in which three communication formats are available, for example, LTE, WiMAX, and EV-DO, desires to engage in peer-to-peer file sharing, video streaming, and web browsing. Different applications can be used on the wireless device for each of these activities. If the wireless device accesses the communication network using EV-DO, the data rate available to the wireless device will be below a threshold to support the video streaming application, and web browsing speeds will also be relatively low. Further, the traffic generated by the activity of the wireless device will increase air interface congestion in the coverage area. If, on the other hand, the wireless device accesses the network using WiMAX or LTE, the data rate available to the wireless device will meet a threshold to support the video streaming application, and web browsing speeds will also be much improved over EV-DO. However, at least in part because greater air interface resources are available, the peer-to-peer application may increase its use of air interface resources, with a negative effect on air resource availability for other wireless devices in the coverage area.

In another example, in a multi-band LTE network, access can be provided to a wireless device in both a 1.9 GHz carrier using FDD and a 2.5 GHz carrier using TDD. A wireless device accessing the network through the 2.5 GHz-TDD carrier can be provided a download data rate sufficiently high to support latency-sensitive applications, for example, video streaming, but will experience low uploading speeds owing to an asymmetrical download/upload ratio (which can be 5/1). In addition, if air interface conditions cause a low signal-to-noise ratio, the wireless device will also experience a rapid battery drain. Conversely, if the wireless device accesses the network through the 1.9 GHz-FDD carrier, the upload data rate achievable by the wireless device will be higher, due to symmetric bandwidth allocation, and battery power can be better preserved over the 2.5 GHz-TDD carrier, but achievable download speeds will likely be below a threshold to support latency-sensitive applications (such as video streaming).

In operation, a communication system such as communication system 200 or 300 can determine application requirements of at least two applications of a wireless device in communication with a wireless communication network. An access node list can be received comprising available mobile communication formats and network load information from each access node in communication with the wireless device. A mobile communication format can be determined from among the available mobile communication formats for each of the at least two applications. Based on the application requirements of the at least two applications, the determined mobile communication formats, and the network load information, a communication schedule can be generated. According to the communication schedule, data can be communicated between the wireless device and the access node according to the communication schedule.

Figure 4:
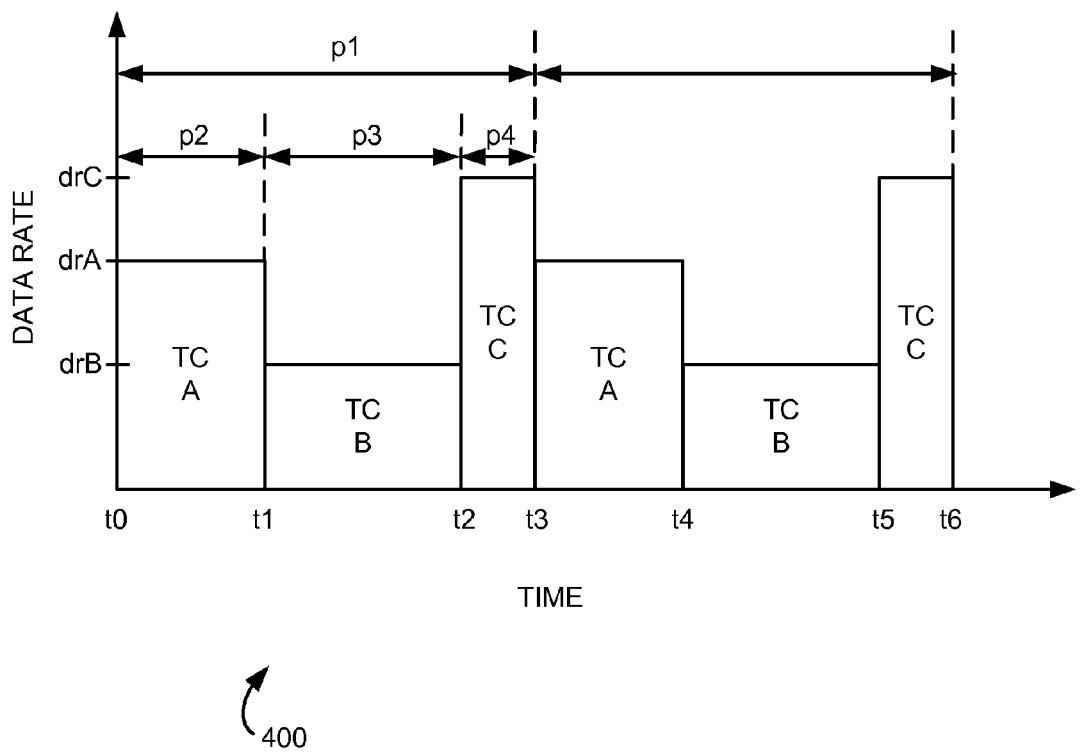
FIG. 4 illustrates an exemplary communication schedule.

FIG. 4 illustrates an exemplary communication schedule. A wireless device, such as wireless device 205 or 305, can communicate with a wireless network using multiple communication formats by scheduling the use of the communication formats over time. The application requirements of at least two applications of a wireless device can be determined. For example, a wireless device can desire to use a peer-to-peer application, a video streaming application, and a web browsing application. In an example, deep packet inspection of a data communication from the wireless device to the communication network can be used to determine the application requirements of each application. That is, non-header packet information (for example, a payload of a packet) can be used to determine the application requirements. In another example, the deep packet inspection can look at layer 3 or beyond, as layers are understood as part of the Open Systems Interconnection (OSI) model of communication systems. In another example, the application requirements include a maximum allowed delay and a minimum throughput requirement for each of the at least two applications.

An access node list can also be received comprising available mobile communication formats and network load information from each access node in communication with the wireless device. The access node can be a single access node with multiple transceivers, or multiple access nodes with one transceiver each, or some combination thereof.

A mobile communication format for each application can be determined, and a communication schedule can be generated for each communication format based on the application requirements, the determined mobile formats, and the network load information. In the exemplary communication schedule illustrated in FIG. 4, a communication schedule further comprises an on duration, an off duration, and a data rate for transceivers to transmit data in each of the determined mobile communication formats. For example, a wireless device with three transceivers TC A, TC B and TC C can be scheduled to communicate during a communication period p1. Transceiver TC A can be scheduled to communicate during a first time period p2 (from time t0 to t1), transceiver TC B can be scheduled to communicate during a second time period p3 (from time t1 to t2), and transceiver TC C can be scheduled to communicate during a third time period p4 (from time t2 to t3).

In addition, the data rates of communication of each of the transceivers can be determined for its respective communication period (p2, p3, p4) to provide an overall data rate during the period p1 of the communication schedule. For example, if a video application requires a data rate of 300 kbps during period p1, and transceiver TC A is designated to communicate in a communication format for the video application, TC A can be scheduled to communicate at a data rate higher than 300 kbps for its scheduled period p2 to provide an overall data rate of 300 kbps during the communication schedule period p1. Packets can be buffered at the wireless device, at the access node, or at another network element such as a gateway, in order to achieve the required data rate during the communication period p1. Thus, as illustrated in FIG. 4, TC A is scheduled for period p2 at data rate drA, TC B is scheduled for period p3 at data rate drB, and TC C is scheduled for period p4 at data rate drC. Each of the data rates drA, drB and drC can be higher than a data rate required by the respective application during the time periods p2, p3 and p4, so that the functional data rates over the time period p1 at least meet a threshold data rate for each application. Thus, the communication schedule can be determined to provide at least a data rate which meets a required minimum throughput requirement and/or a maximum allowed delay for each application.

To communicate data between the wireless device and the access node or nodes, a communication path is established for each of the transceivers TC A, TC B and TC C, and thus for each of the determined communication formats. During each time period p2, p3, and p4, data is communicated by one of the transceivers TC A, TC B and TC C. When a transceiver is not communicating data, its respective communication path is maintained. That is, when a transceiver is scheduled to communicate, it is in a active mode and is connected to the network and sending and/or receiving data. When a transceiver is not scheduled to communicate during the communication schedule, the transceiver is in an inactive mode where the transceiver is connected to the network but not transmitting and/or receiving data. Thus, for each of the transceivers in the communication schedule, a connection between the wireless device and the access node or nodes is maintained in each of the communication paths while data is communicated with only one of the transceivers according to the communication schedule.

The communication schedule can be repeated, for example, as illustrated in FIG. 4 from time t3 to time t6. In addition, the communication schedule can be determined to balance network load based on the network load information.

For example, a communication format that consumes fewer air interface resources can be scheduled with a larger time period, and a communication format that consumes a greater number of air interface resources can be schedule with a smaller time period, based on the network load information. Network load balancing can be considered in addition to, or alternatively to, the application requirements. The communication schedule can be implemented to schedule transceivers at a wireless device, or it can be implemented to schedule transceivers at an access node.

Figure 5:
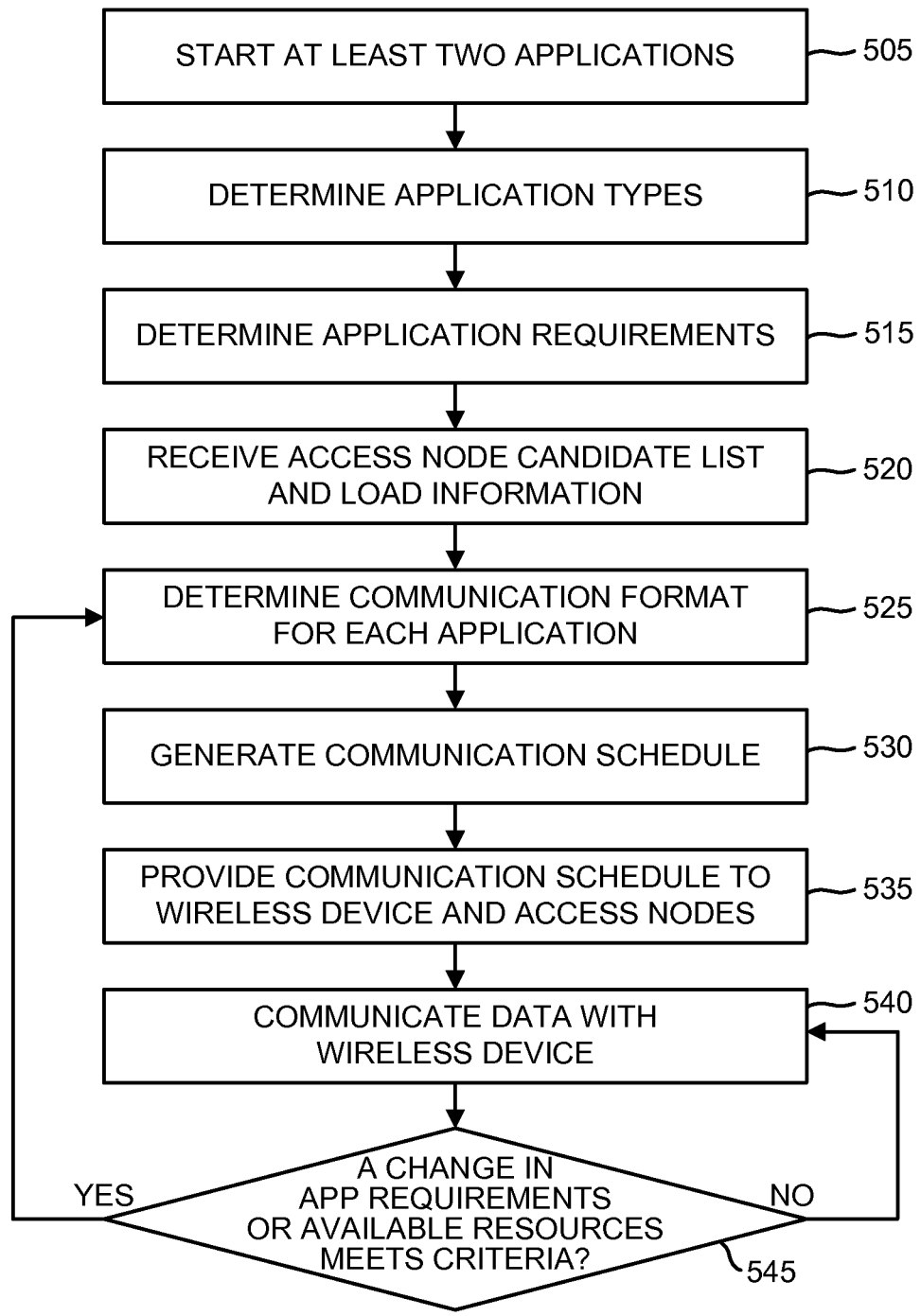
FIG. 5 illustrates an exemplary method of managing data transfer in a multi-technology wireless communication network.

FIG. 5 illustrates an exemplary method of managing data transfer in a multi-technology wireless communication network. A wireless communication network can include, for example, the elements of communication systems 200 or 300, as well as combinations thereof. In operation 505, a wireless device starts at least two applications involving data communication over a wireless network, which can be detected at an access node or a network gateway. In operation 510, the application types are determined, and in operation 515 the application requirements are determined. For example, a wireless device can desire to use a peer-to-peer application, a video streaming application, and a web browsing application. In an example, deep packet inspection of a data communication (such as a data request) from the wireless device to the communication network can be used to determine the application requirements of each application. That is, non-header packet information (for example, a payload of a packet) can be used to determine the application requirements. In another example, the deep packet inspection can look at OSI layer 3 or beyond. In another example, the application requirements include a maximum allowed delay and a minimum throughput requirement for each of the at least two applications.

In operation 520, an access node candidate list and load information about each access node in communication with the wireless device is received. The access node candidate list can include one access node with multiple transceivers, or multiple access nodes with one transceiver each, or a combination thereof.

In operation 525, a mobile communication format for each application can be determined, and in operation 530 a communication schedule can be generated for each communication format based on the application requirements, the determined mobile communication formats, and the network load information. A communication schedule further comprises determining an on duration, an off duration, and a data rate for transceivers to transmit data in each of the determined mobile communication formats. In addition, the communication schedule can be determined to balance network load based on the network load information. For example, a communication format that consumes fewer air interface resources can be scheduled with a larger time period, and a communication format that consumes a greater number of air interface resources can be schedule with a smaller time period, based on the network load information. Network load balancing can be considered in addition to, or alternatively to, the application requirements. In addition, data flows, for example, data flows associated with each of the applications, can be prioritized, so that a data rate which meets a data rate threshold is provided to each of the applications, to avoid application performance deterioration through, for example, packet dropping and retransmission, excessive latency, or throughput reduction.

In operation 535, the communication schedule can be provided to the wireless device and to the access node or nodes in communication with the wireless device, and in operation 540 data is communicated between the wireless device and the access node or nodes according to the communication schedule.

To communicate data between the wireless device and the access node or nodes, a communication path is established for each of the transceivers associated with a determined communication format. When a transceiver is scheduled to communicate, it is in a active mode and is connected to the network and sending and/or receiving data, and when a transceiver is not scheduled to communicate during the communication schedule, the transceiver is in an inactive mode where the transceiver is connected to the network but not transmitting and/or receiving data. Thus, for each of the transceivers in the communication schedule, a connection between the wireless device and the access node or nodes is maintained in each of the communication paths while data is communicated with only one of the transceivers according to the communication schedule.

If there is a change in the requirements of an application, or if the available air interface resources meet a criteria (operation 545-YES) then based on the changed factor or factors the communication format for each application can be redetermined, and an updated communication schedule can be generated and communicated to the wireless device and access node or nodes to schedule communication using the multiple communication formats. The method 500 can be implemented, for example, at a gateway of a communication network, and can also be implemented at a wireless device or at an access node of the communication network.

Figure 6:
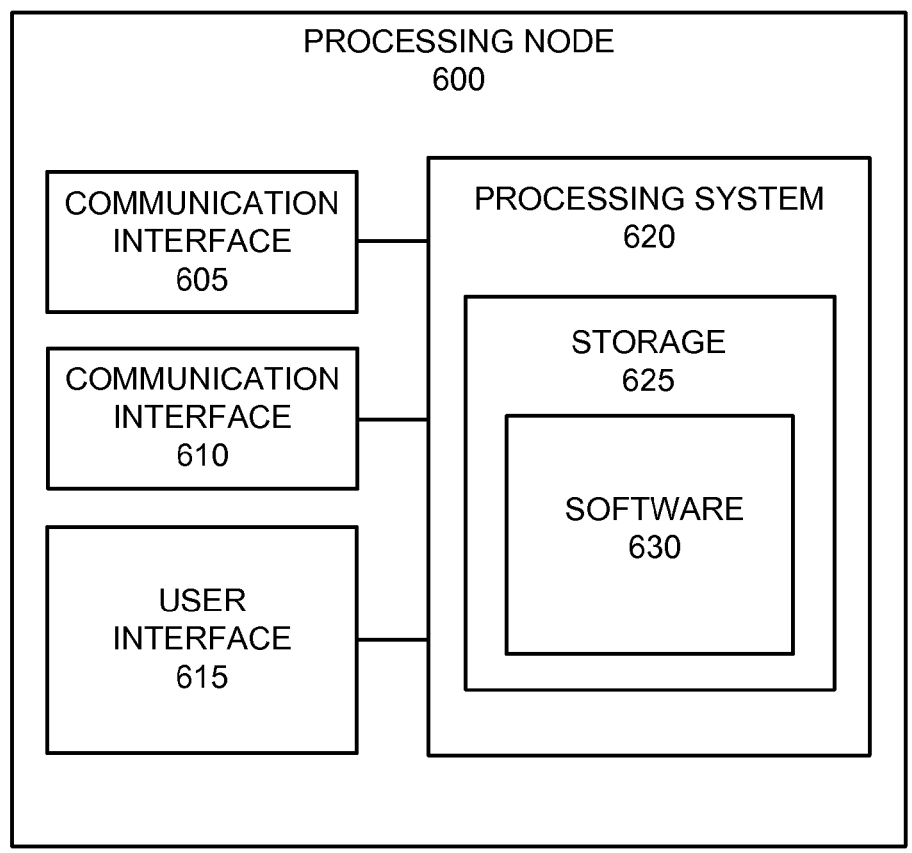
FIG. 6 illustrates an exemplary processing node.

FIG. 6 illustrates an exemplary processing node. Examples of a processing node 600 include access nodes 210, 310 and 315, and gateway 215, as well as other network elements which can function as a processing node. Processing node 600 can include a first communication interface 605, a second communication interface 610, and a user interface 615, each in communication with a processing system 620. Communication interfaces 605 and 610 can send and receive information under the direction of the processing system 620. Where processing node 600 is illustrative of an access node, communication interfaces 605 and 610 can be associated with transceivers of the access node. Where processing node 600 is illustrative of a gateway or another network element, communication interfaces 605 and 610 can be, for example, in communication with transceivers of an access node, for example TC1 and TC2 of access node 210. In an embodiment, processing node 600 can implement an element management system (EMS) which can manage network elements in a communication system including receiving information from all carriers related to, for example, application requirements, available mobile communication formats, and network load information.

Processing system 620 can include storage 625. Storage 625 comprises a disk drive, flash drive, memory circuitry, or other memory device. Storage 625 can store software 630 which is used in the operation of the processing node 600. Software 630 may include an operating system, utilities, drivers, network interfaces, applications, or some other type of software. Processing node 600 can also include a user interface 615 to permit a user to configure and control the operation of the processing node 600.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of managing data transfer in a multi-technology wireless communication network, comprising:
   determining application requirements of at least two applications of a wireless device in communication with the wireless communication network;
   receiving an access node list comprising available mobile communication formats and network load information from each access node in communication with the wireless device;
   determining a mobile communication format from among the available mobile communication formats for each of the at least two applications;
   generating a communication schedule based on the application requirements of the at least two applications, the determined mobile communication formats, and the network load information, wherein the schedule includes a time period comprising at least a first sub-time period and a second sub-time period; and
   communicating data between the wireless device and the access node according to the communication schedule based on the time period, wherein data formatted according to the determined mobile communication format for the first application is communicated over the first sub-time period and data formatted according to the determined mobile communication format for the second application is communicated over the second sub-time period, and the communication is repeated over at least two time periods.

2. The method of claim 1, wherein communicating data further comprises:
   establishing communication paths between the wireless device and the access node for each of determined mobile communication formats; and
   communicating data between the wireless device and the access node according to the communication schedule in one of the communication paths while maintaining a connection between the wireless device and the access node in each of the communication paths.

3. The method of claim 1, further comprising:
   determining when a change in the application requirements of one of the at least two applications meets a first change criteria; and
   repeating the generating a communication schedule and the communicating data between the wireless device and the access node based on the change in the application requirements.

4. The method of claim 1, further comprising:
   determining when a change in the network load information of at least one of the access nodes meets a second change criteria; and
   repeating generating a communication schedule and transmitting data to the wireless device based on the change in the network load information.

5. The method of claim 1, wherein determining the application requirements further comprises determining at least one of a maximum allowed delay and a minimum throughput requirement for each of the at least two applications.

6. The method of claim 1, wherein generating a communication schedule further comprises determining a communication period, a non-communication period, and a data rate for transceivers to transmit data in each of the determined mobile communication formats.

7. The method of claim 6, wherein the communication period, the non-communication period, and the data rate are determined to at least one of meet the application requirements of the at least two applications and balance a network load based on the network load information.

8. The method of claim 6, wherein a communication period for a first transceiver comprises the first sub-time period, a non-communication period for the first transceiver comprises the second sub-time period, a communication period for a second transceiver comprises the second sub-time period, and a non-communication period for the second transceiver comprises the first sub-time period.

9. The method of claim 6, wherein a data rate for a first transceiver comprising a communication period over the first sub-time period is greater than a data rate based on the application requirement for the first application such that the data rate based on the application requirement for the first application is met over the time period.

10. The method of claim 1, wherein generating a communication schedule further comprises scheduling transceivers of the access node to communicate data with the wireless device in a sequence of the determined mobile communication formats.

11. The method of claim 1, wherein generating a communication schedule further comprises scheduling transceivers of the wireless device to communicate data with the access node in a sequence of the determined mobile communication formats.

12. The method of claim 1, wherein generating a communication schedule further comprises prioritizing data flows for each application based on the determined application requirements.

13. The method of claim 1, wherein generating a communication schedule further comprises providing the communication schedule to the wireless device and to each access node in communication with the wireless device.

14. A processing node to manage data transfer in a multi-technology wireless communication network, comprising:
a first communication interface to communicate in a first communication format;
a second communication interface to communicate in a second communication format; and
a processing system configured to
receive a data communication from at least two applications of a wireless device in communication with at least one access node through one of the first and second communication interfaces,
receive an access node list comprising available mobile communication formats and network load information from each of the at least one access nodes through one of the first and second communication interfaces,
determine application requirements of at least two applications based on the data communications,
determine a mobile communication format from among the available mobile communication formats for each of the at least two applications,
generate a communication schedule based on the application requirements of the at least two applications, the determined mobile communication formats, and the network load information, wherein the schedule includes a time period comprising at least a first sub-time period and a second sub-time period,
transmit through one of the first and second communication interfaces the communication schedule to the at least one access node and to the wireless device to communicate data between the wireless device and the at least one access node according to the communication schedule,
establish communication paths between the wireless device and the access node for each of the determined mobile communication formats, and
communicate data between the wireless device and the access node based on the time period according to the communication schedule in one of the communication paths while maintaining a connection between the wireless device and the access node in each of the communication paths, wherein data formatted according to the determined mobile communication format for the first application is communicated over the first sub-time period and data formatted according to the determined mobile communication format for the second application is communicated over the second sub-time period, and the communication is repeated over at least two time periods.

15. The processing node of claim 14, wherein the processing system is further configured to:
determine when a change in the application requirements of one of the at least two applications meets a first change criteria, and
generate a communication schedule based on the change in the application requirements.

16. The processing node of claim 14, wherein the processing system is further configured to:
determine when a change in the network load information of at least one of the access nodes meets a second change criteria, and
generate a communication schedule based on the change in the network load information.

17. The processing node of claim 14, wherein application requirements comprise a maximum allowed delay and a minimum throughput requirement for each of the at least two applications.

18. The processing node of claim 14, wherein the communication schedule comprises a communication period, a non-communication period, and a data rate for transceivers to transmit data in each of the determined mobile communication formats.

19. The processing node of claim 18, wherein the communication period, the non-communication period, and the data rate are determined to meet the application requirements of the at least two applications.

20. The processing node of claim 18, wherein the communication period, the non-communication period, and the data rate are determined to meet the application requirements of the at least two applications and to balance a network load based on the network load information.

* * * * *